United States Patent
Britt, Jr.

(10) Patent No.: US 7,136,982 B2
(45) Date of Patent: Nov. 14, 2006

(54) APPARATUS AND METHOD FOR ALLOCATING MEMORY BLOCKS

(75) Inventor: Joe Freeman Britt, Jr., Los Gatos, CA (US)

(73) Assignee: Danger, Inc., Palo Alto, CA (US)

( * ) Notice: Subject to any disclaimer, the term of this patent is extended or adjusted under 35 U.S.C. 154(b) by 148 days.

(21) Appl. No.: 10/053,205

(22) Filed: Nov. 9, 2001

(65) Prior Publication Data

US 2003/0093643 A1 May 15, 2003

(51) Int. Cl.
G06F 12/08 (2006.01)
G06F 12/00 (2006.01)

(52) U.S. Cl. ...................................... 711/170
(58) Field of Classification Search ................ 711/161, 711/162
See application file for complete search history.

(56) References Cited

U.S. PATENT DOCUMENTS

| | | |
|---|---|---|
| 5,159,592 A | 10/1992 | Perkins |
| 5,559,800 A | 9/1996 | Mousseau et al. |
| 5,715,387 A | 2/1998 | Barnstijn et al. |
| 5,727,202 A | 3/1998 | Kucala |
| 5,790,974 A | 8/1998 | Tognazzini |
| 5,802,312 A | 9/1998 | Lazaridis et al. |
| 5,832,493 A | 11/1998 | Marshall et al. |
| 5,926,826 A | 7/1999 | Ninomiya et al. |
| 5,961,590 A | 10/1999 | Mendez et al. |
| 6,023,708 A | 2/2000 | Mendez et al. |
| 6,219,830 B1* | 4/2001 | Eidt et al. .................... 717/139 |
| 6,330,618 B1 | 12/2001 | Hwwkins et al. |
| 6,396,482 B1 | 5/2002 | Griffin et al. |
| 6,434,683 B1* | 8/2002 | West et al. ................. 711/162 |
| 6,549,980 B1* | 4/2003 | Landau ....................... 711/114 |

FOREIGN PATENT DOCUMENTS

EP 0 907 285 A1 4/1999

OTHER PUBLICATIONS

Larry L. Peterson and Bruce S. Davie, Computer Netoworks, Published 2000, Academic Press, Second Edition, Chapter 2, p. 92-101, Chapter 4, pp. 251-256, Chapter 8, pp. 570-571 and 588, and Glossary, p. 678.*

* cited by examiner

Primary Examiner—Sanjiv Shah
Assistant Examiner—Midys Rojas
(74) Attorney, Agent, or Firm—Blakely, Sokoloff, Taylor & Zafman, LLP

(57) ABSTRACT

A method is disclosed for storing program code on a data processing device comprising: splitting the program code into one or more blocks; assigning each of the blocks a header containing a sequence number identifying which portion of the program code each of the blocks correspond to; and storing the one or more blocks of program code and the associated headers in a non-volatile memory.

23 Claims, 5 Drawing Sheets

APPARATUS AND METHOD FOR ALLOCATING MEMORY BLOCKS

BACKGROUND OF THE INVENTION

1. Field of the Invention

This invention relates generally to the field of memory management. More particularly, the invention relates to an improved apparatus and method for allocating memory blocks.

2. Description of the Related Art

As illustrated in FIG. 1, non-volatile storage media 1000 (e.g., flash memory, hard drives, . . . etc) are typically divided into a plurality of contiguous blocks of memory. Accordingly, in order to store an application or other type of program code (e.g., "Application D") to non-volatile memory 1000, a file system 1030 breaks the application up into blocks. In addition, to track which blocks correspond to which application, the file system 1030 generates some type of indexing data structure.

One type of indexing data structure is a file allocation table ("FAT") which includes a pointer to each block for each application. Thus, in the example shown in FIG. 1, the FAT would include four separate pointers identifying each of the four blocks in which Application D is stored. Subsequently, when Application D is loaded into volatile memory 1010, the file system 1030 performs a lookup to the FAT to locate each of the four blocks (which, as illustrated, may or may not be stored contiguously).

Alternatively, the indexing data structure may contain a single pointer which identifies the first block in the series of blocks (e.g., block "Application $D_1$"). Each block contains a pointer identifying the next block in the series. For example, the first block contains a pointer identifying the second block (e.g., block "Application $D_2$"), the second block contains a pointer identifying the third block (e.g., block "Application $D_3$"), and so on, until the final block (e.g., block "Application $D_4$") is reached (which contains data indicating that it is the final block in the series).

One problem which exists with current block allocation techniques is that if any portion of the indexing data structure is corrupt the entire application must be reloaded. Accordingly, if the pointer to Application $D_3$ is lost from the FAT, there is no way to restore only this portion of the application. As such, the entire application must be reloaded and a new FAT entry identifying the application must be generated. In addition, indexing data structures may consume a significant amount of memory.

Accordingly, what is needed it an improved system and method for allocating memory blocks.

SUMMARY

A method is disclosed for storing program code on a data processing device comprising: splitting the program code into one or more blocks; assigning each of the blocks a header containing a sequence number identifying which portion of the program code each of the blocks correspond to; and storing the one or more blocks of program code and the associated headers in a non-volatile memory.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
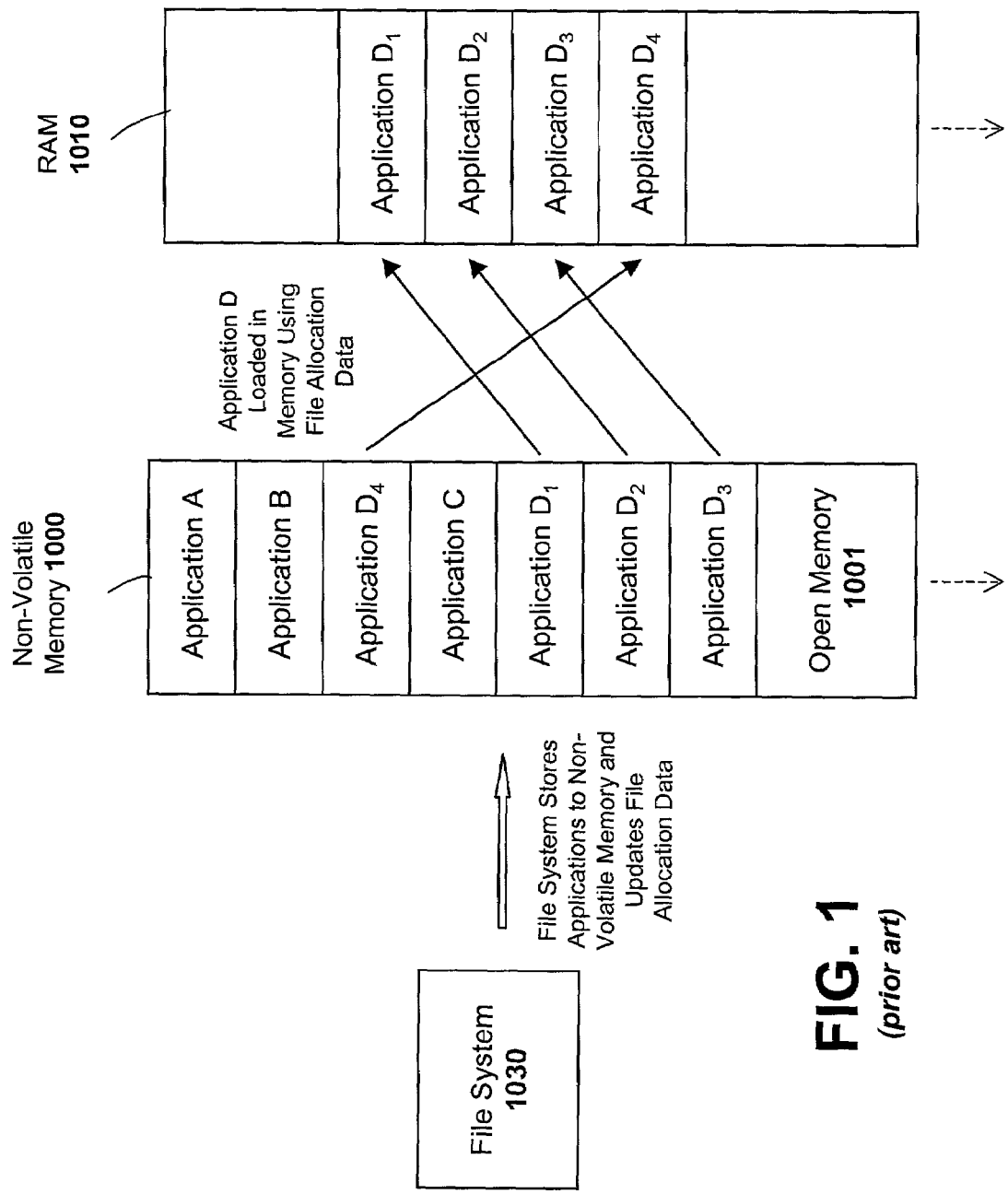
FIG. 1 illustrates prior art block allocation techniques.
Figure 2:
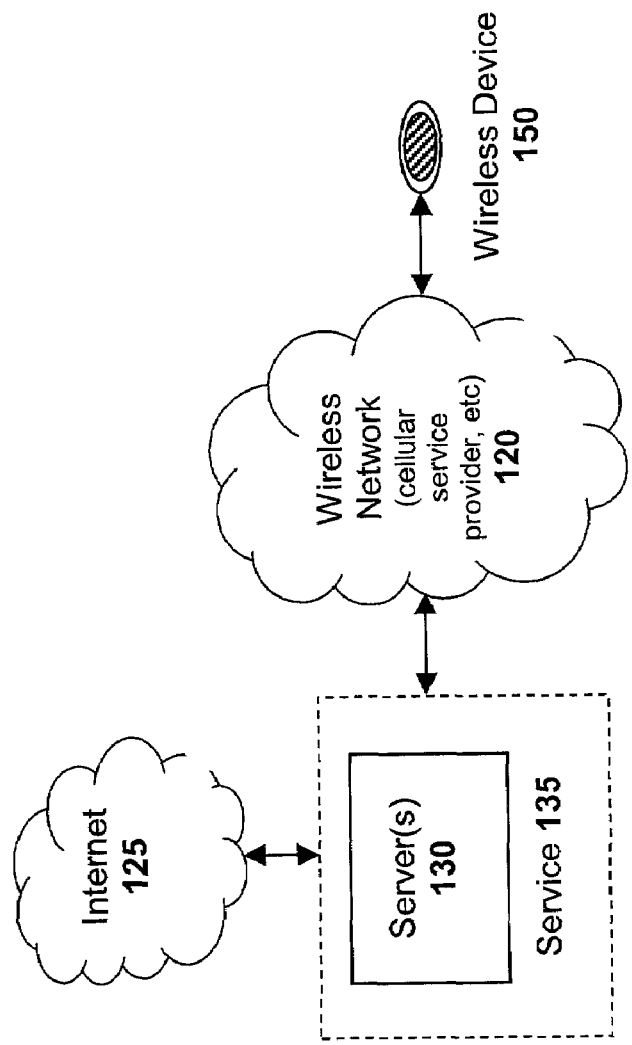
FIG. 2 illustrates an exemplary network architecture used to implement elements of the present invention.

Embodiments of the invention may be implemented on a wireless data processing device 150 such as that illustrated in FIG. 2. However, it should be noted that the block-based storage techniques described herein may be implemented on virtually any type of data processing apparatus (e.g., a personal computer) in which data is stored in a non-volatile memory.

According to the embodiment shown in FIG. 2, the wireless data processing device 150 communicates with a data service 135 (comprised of one or more servers 130) over a wireless network 120. The data service 135 may manage various types of data on behalf of the user of the wireless device 150 (e.g., email, electronic calendar, to-do list . . . etc) and may provide the wireless data processing device 150 with program code such as applications and operating system upgrades. The data service 135 may also act as a proxy to connect the wireless device 150 to other servers over the Internet 125. In one embodiment, the service 135 converts data and program code requested from the Internet into a format which the data processing device 150 can properly interpret. For example, the service 135 may convert images embedded within Web pages into an imaging format which the data processing device can display (e.g., by adjusting grayscale level, resolution, . . . etc). As such, in this embodiment, the service 135 has an intimate knowledge of the capabilities/configuration of each wireless device 150, and formats data/content requested from the Internet accordingly.

The wireless device 150 may communicate with the service 135 using various RF communication protocols/techniques. For example, in one particular embodiment, the wireless device 150 transmits and receives data to/from a cellular network via a cellular packet-switched protocol such as the cellular digital packet data ("CDPD") standard. Embodiments of the wireless device may also be configured to transmit/receive data using a variety of other communication standards including 2-way paging standards and third generation ("3G") wireless standards (e.g., UTMS, CDMA 2000, NTT DoCoMo, . . . etc).

When receiving data and program code (e.g., new applications, patches, operating system upgrades), from the server 135, the data processing device 150 may employ the block allocation techniques described herein. In particular, in one embodiment, the service 135 monitors all program code and data stored on the wireless device 150. As such, the service 135 may track where applications and other program code are stored within non-volatile memory on the device and then use this information to store new programs and provide upgrades and program patches in a more intelligent, efficient manner.

Figure 3:
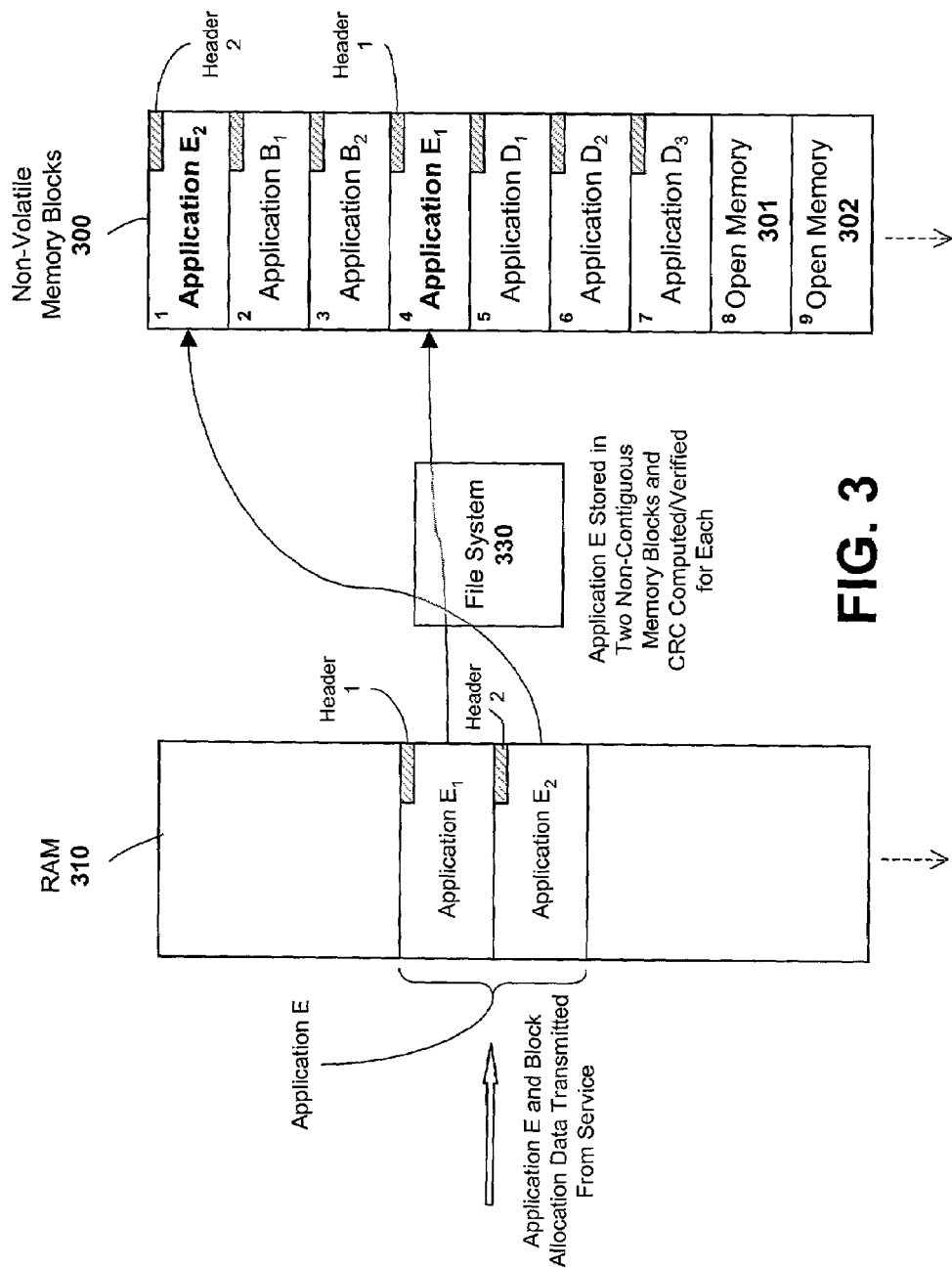
FIG. 3 illustrates block allocation techniques implemented in accordance with one embodiment of the invention.

As illustrated in FIG. 3, in one embodiment, applications are first downloaded to a buffer in volatile memory 310 before being stored in non-volatile memory 300. The download may be performed transparently to the end user. For example, the application may be downloaded during periods of low network activity (e.g., in the late evening or early morning) or may be transmitted into the device as a background process, without interfering with other device functions.

Once the application has been buffered in volatile memory 310, the wireless device's file system 330 stores it to non-volatile memory 300. As indicated in FIG. 3, the non-volatile memory 300 may be logically divided into a plurality of memory "blocks." As such, applications larger than a single memory block, such as Application E, may be split between two non-contiguous memory blocks (blocks 1 and 4 in the example). In one embodiment, the blocks are 16 Kbytes in size. However, the underlying principles of the invention are not limited to any particular block size.

In one embodiment, the service 135 may also transmit block allocation data to the device's file system 330 identifying specific non-volatile memory blocks in which the new program should be stored. In another embodiment, the service 135 allows the file system 330 to determine how to break up the program code between blocks. In either case, the service 135 may monitor where the applications are stored in non-volatile memory 300 (e.g., the specific blocks into which the applications are stored) and subsequently uses this information when downloading upgrades and patches to the device (as described in detail below).

In one embodiment, the program code is compressed before it is stored to the non-volatile memory 300, thereby conserving additional non-volatile memory space. Either the service 135 may compress the code before it is downloaded or the wireless device 150 may compress the code. Various compression techniques may be employed including, for example, LZ compression and/or Huffman coding. In one embodiment, the program code is compressed as a single unit before it is split between the non-volatile memory blocks.

In one embodiment, each block stored in the non-volatile memory 300 includes a header (e.g., such as Headers 1 and 2 illustrated in FIG. 3). Various types of header information may be included for each block. In one embodiment, the header identifies the application (or other type of file) with which the block is associated and a sequence number indicating the block sequence within the application.

Cyclical Redundancy Checking ("CRC") data may also be transmitted from the service 135 to the device within the block headers. As is known in the art, CRC is an error checking technique used to ensure the accuracy of transmitted data. In one embodiment, each individual block of program code is provided with a separate CRC. For example, in FIG. 3, CRCs stored in Header 1 and Header 2 may be associated with the portion of Application E stored in memory blocks 4 and 1, respectively (identified as "Application $E_1$" and "Application $E_2$," respectively). The file system 330 ensures that each block of program code is valid by running a CRC before storing the block to non-volatile memory. If the CRC fails, the individual block is re-downloaded from the service 135. Accordingly, one benefit of allocating programs into blocks as described herein is that if an error is detected in a block, the entire program will not need to be re-downloaded—only the individual block which contains the errors.

In addition, for authentication purposes, each application downloaded from the service 135 may contain a unique signature (e.g., embedded in the application header). Before executing the application and/or before storing the application into non-volatile memory 300, the wireless device 150 will check the signature to authenticate the application (i.e., to verify that the application is one provided by the portal service). In one particular embodiment, the signature is generated at the service 135 using a private key and authenticated on the wireless data processing device 150 using a public key (e.g., which may be stored in a ROM on the device 150).

Figure 4:
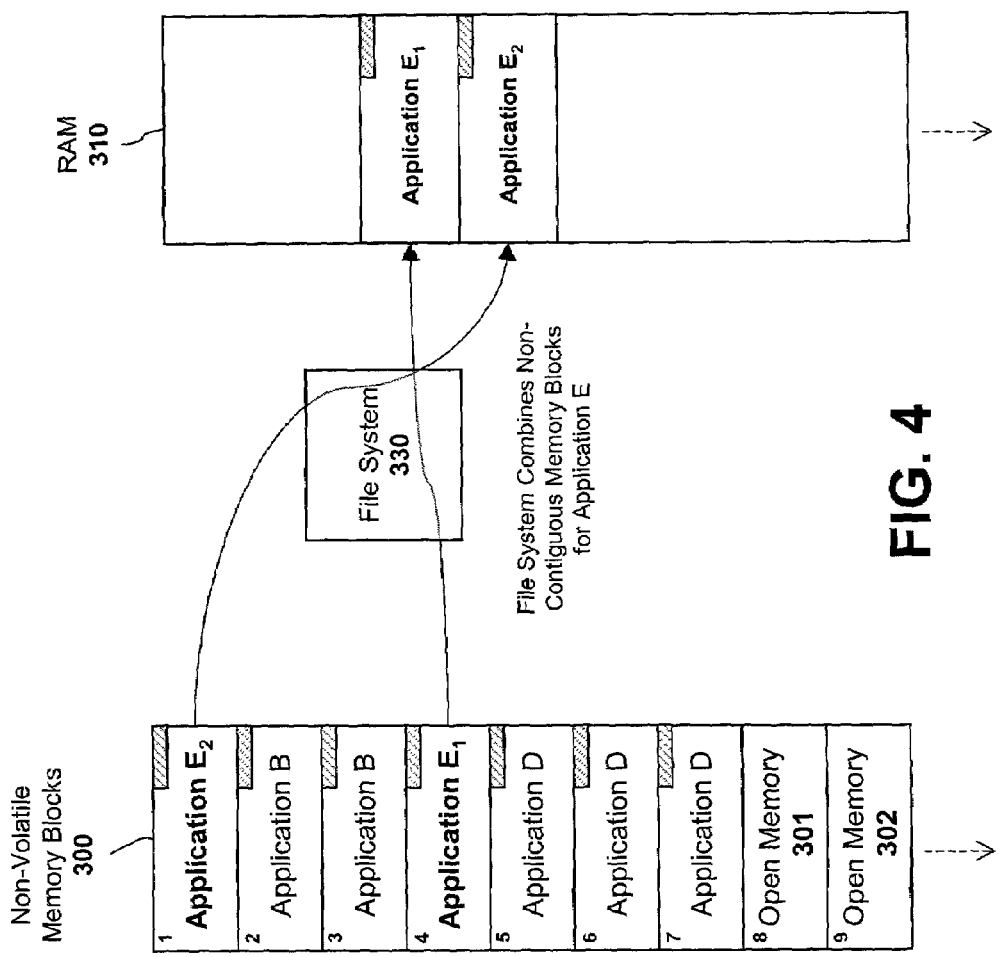
FIG. 4 illustrates reading an application from two separate blocks according to one embodiment of the invention.

As illustrated in FIG. 4 after an application (Application E) is stored in non-volatile memory 300 it must be loaded into volatile memory 310 to be executed on the device. If the application is spread across several non-contiguous non-volatile memory blocks, the blocks must be put back together in the correct order for the application to run. Moreover, if the program code is compressed, it must be decompressed.

In one embodiment, the file system 330 uses the block sequence numbers contained within the block headers to load the application (or other type of file) into memory. Accordingly, in this embodiment, no supplemental indexing data structure is required to track the location of the blocks for each application. Rather, to load and/or execute an application in memory 310 (e.g. due to a user command or at power up), the file system 330 simply locates each block in the non-volatile memory 300 (e.g., by scanning the memory 300 for blocks associated with the selected application) and loads each of the blocks into memory 310 based on the blocks' assigned sequence numbers. As a result, a single corrupt block may be individually downloaded from the service 135 and replaced. That is, the corrupt block will not affect the device's ability to locate the other blocks associated with the application.

Figure 5:
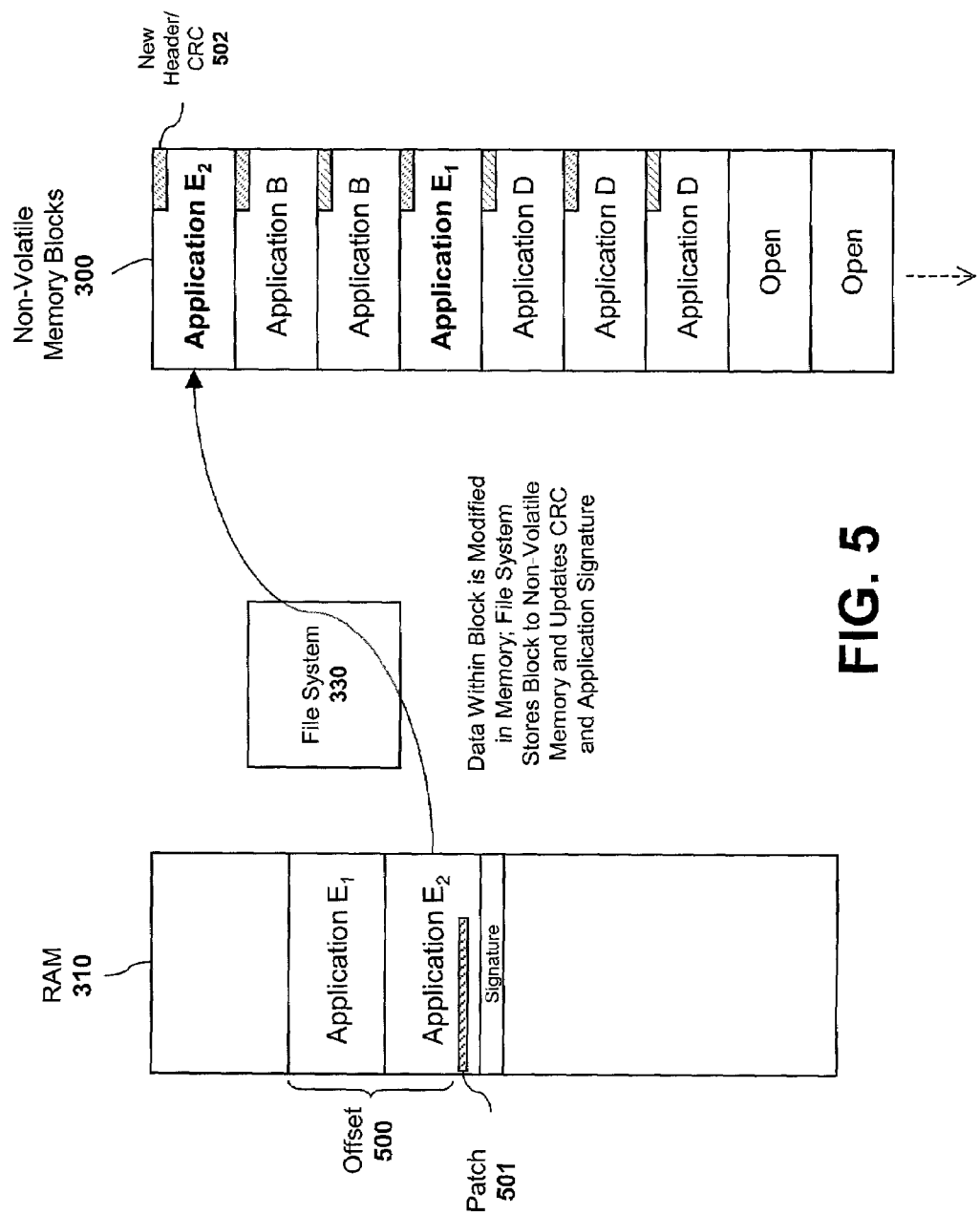
FIG. 5 illustrates an application patch according to one embodiment of the invention.

Because the service 135, in one embodiment, knows exactly how/where program code is stored on the wireless device, it may perform system/application upgrades with greater precision than prior systems. For example, as illustrated in FIG. 5, if an application requires a patch of only several bytes of data 501, in one embodiment, the service 135 may only transfer the several-byte patch 501 to the wireless device 150 along with an offset 500 indicating exactly where the patch should overwrite the existing application code. In response, the wireless device will load the application in memory, overwrite the program code with the patch 501 and store the modified blocks back to non-volatile memory.

In addition, once the application code is overwritten, the wireless device calculates a new header/CRC 502 for the modified block. It compares the calculated CRC with the CRC transmitted from the service 135. If the calculated CRC matches, then the modified block of program code is stored back to non-volatile memory. In one embodiment, a new signature is also provided for the modified application (Application E). As described above, the wireless device 150 verifies the signature (e.g., via the public key) before storing and/or executing the application.

The foregoing level of precision was not possible in prior client/server systems in which the server is blind to the manner in which program code is stored on the client. By monitoring exactly which applications (and other types of program code) have been loaded on the wireless device 150 and understanding exactly how the wireless device stores program code blocks (e.g., by running through the same algorithm used on the wireless device 150 to store the program code), the service 135 is able to construct a map of exactly how the applications are stored in non-volatile memory 300 on the wireless device 150 and exactly how they will be loaded into volatile memory 310 for execution. As such, patches and application upgrades may be performed by transmitting only those portions of program code which need to be added to the application along with an indication of where they should be added (e.g., a memory offset).

Different embodiments of the service 135 may employ different techniques to monitor how the wireless device 150 stores applications and other program code. In one embodiment, the service 135 maintains a list of transactions for each wireless device 150. The list may include new application downloads, application deletions, application patches, application upgrades and any other transactions which may cause a change in the wireless device's memory allocation. When the wireless device 150 requests a new transaction (e.g., an application upgrade), the service 135 runs through the list to construct a map of the program code currently stored on the device (i.e., based on its knowledge of the algorithms employed by the wireless device 150 to store the program code). Once the map is constructed, the service 135 can upload new content to the device 150 as described herein.

Alternatively, rather than constructing a map on the fly by running through the transaction list, the service 135 may continually maintain an up-to-date map of the program code allocation for each wireless device. The map is then updated each time the wireless device 150 executes a new transaction. The underlying principles of the invention remain the same regardless of how the service 135 generates a program code map for the wireless device 150. The end result is that application/system upgrades and patches may be performed using a limited amount of network bandwidth.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the block allocation techniques were described above in the context of a wireless service, the underlying principles of the invention may be implemented on virtually any network and on any data processing platform. Accordingly, the scope and spirit of the invention should be judged in terms of the claims which follow.

What is claimed is:

1. A method implemented by a service for maintaining control over stored one or more applications on a data processing device:
   transmitting said one or more applications from a server to said data processing device concurrently with block allocation data indicating blocks on said data processing device into which said one or more applications are to be stored; and
   maintaining a list of all subsequent data transactions performed with said data processing device during end-user operation of said device, said list usable by said server to construct a map of all applications stored on said data processing device.

2. The method as in claim 1 further comprising:
   generating said map of all applications stored on said data processing device prior to a new transaction with said data processing device.

3. The method as in claim 2 wherein said new transaction is an application patch.

4. The method as in claim 2 wherein said new transaction is a new application download.

5. The method as in claim 3 further comprising:
   transmitting said patch to said data processing device along with an indication of where said patch should overwrite a portion of said application.

6. The method as in claim 5 wherein said indication is an offset in memory.

7. The method as in claim 6 further comprising:
   loading said one or more blocks of program code into volatile memory,
   identifying said portion of said program code with said offset and
   overwriting said portion of said program code with said program code patch.

8. The method as in claim 7 further comprising:
   executing an error checking algorithm to ensure said one or more blocks of program code containing said program code patch are valid.

9. The method as in claim 8 further comprising:
   storing said one or more blocks of program code containing said program code patch to non-volatile memory.

10. A method comprising:
    maintaining a program code map on a server indicating how program code is allocated among a plurality of non-volatile memory blocks on a data processing device;
    using said program code map to facilitate modifications to said program code on said data processing device;
    maintaining a list of transactions between said server and said data processing device during end-user operation of said data processing device; and
    running an algorithm to construct said map in realtime using said list of transactions, said algorithm being an algorithm executed on said data processing device to store program code within said plurality of non-volatile memory blocks of the data processing device.

11. The method as in claim 10 wherein using said program code map comprises:
    calculating a location of a program code patch within said program code; and
    transmitting said program code patch to said data processing device along with said location.

12. The method as in claim 11 wherein said location is an offset in memory.

13. The method as in claim 10 wherein said non-volatile memory blocks are flash memory blocks.

14. The method as in claim 10 wherein using said program code map comprises:
identifying a specific block within said non-volatile memory to be replaced;
transmitting said specific block to said data processing device;
said data processing device combining said block in volatile memory with one or more other blocks containing program code for a specific application and verifying a signature of said application; and
saving said specific block to non-volatile memory once said signature is verified.

15. The method as in claim 14 further comprising:
executing a cyclical redundancy checking (CRC) to verify that said program code within said specific block is valid.

16. A system comprising:
a server to transmit program code to a data processing device and during end-user operation of said data processing device to maintain a list of transactions between said server and said data processing device and to monitor (1) which program code is stored on said data processing device and (2) specific areas in a memory space in which said program code is stored on said data processing device; and
the server to transfer additional program code to said data processing device along with storage location data indicating where in said memory said additional program code should be stored.

17. The system as in claim 16 wherein said storage location data comprises an offset in said memory of said data processing device indicating where within said memory said additional program code should be transmitted.

18. The system as in claim 16 wherein said storage location data comprises one or more non-volatile memory blocks where said additional program code should be stored.

19. The system as in claim 18 wherein said additional program code comprises a patch to a current program stored on said data processing device.

20. The system as in claim 19 wherein said server transfers an updated CRC value with said patch, said CRC value identifying data within a particular block in which said patch is required as being valid data.

21. The system as in claim 18 wherein said server transfers a cyclical redundancy checking (CRC) value with each block of program code transmitted to said data processing device.

22. The system as in claim 19 wherein said server transfers an updated application signature usable by said data processing device to authenticate an application upgraded by said patch.

23. The system as in claim 16 wherein said data processing device is a wireless device.

* * * * *